July 25, 1933.  J. R. RICHARDSON  1,920,107
PROCESS AND APPARATUS FOR TREATING COTTON SEEDS AND OTHER GRAIN
Filed Jan. 24, 1927
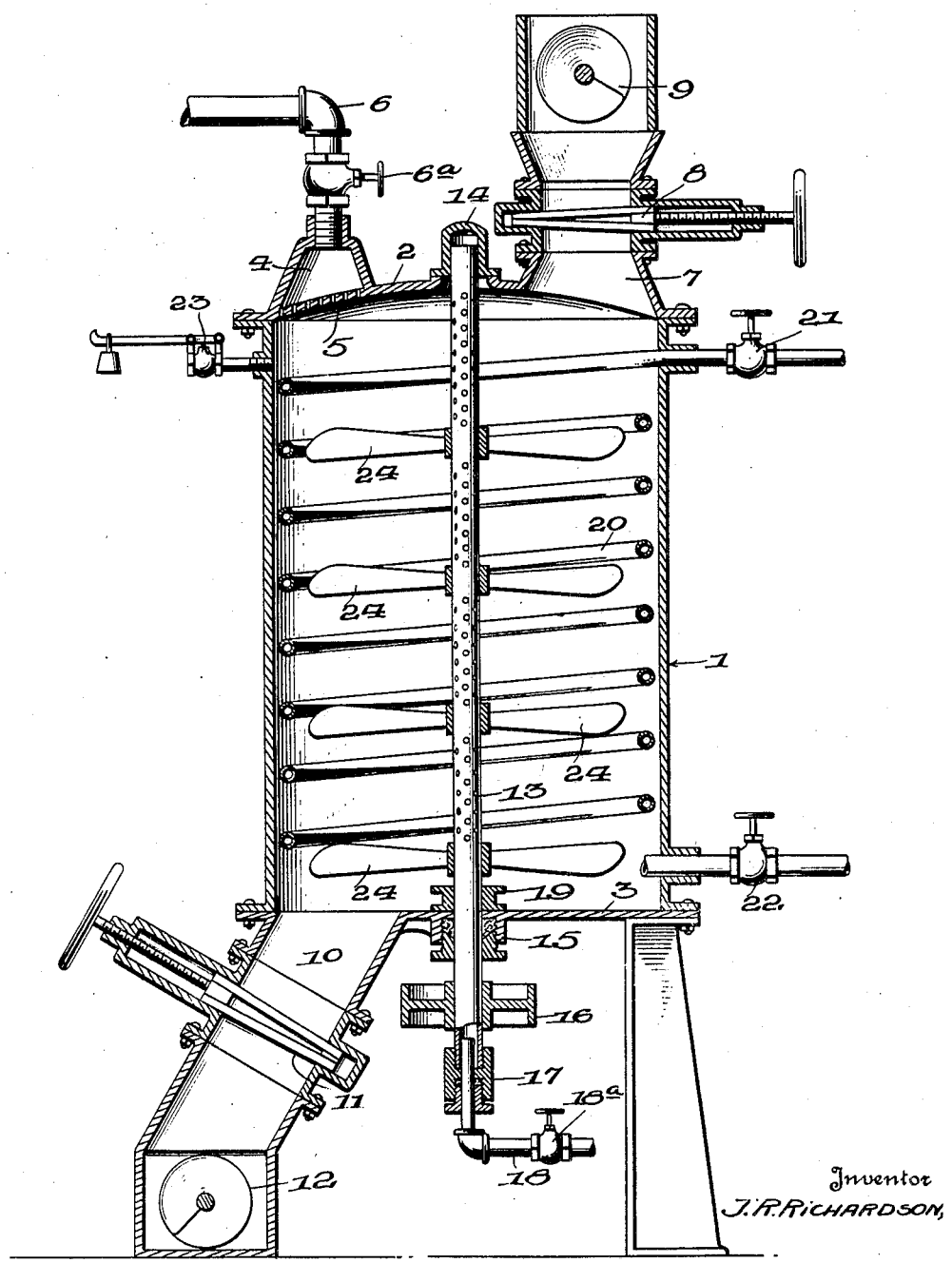
Inventor
J. R. RICHARDSON,
By Cushman Bryant & Darby
Attorney Patented July 25, 1933

1,920,107

UNITED STATES PATENT OFFICE

JAMES R. RICHARDSON, OF HOUSTON, TEXAS, ASSIGNOR TO ABILENE COTTON OIL COMPANY, OF ABILENE, TEXAS, A CORPORATION OF TEXAS

PROCESS AND APPARATUS FOR TREATING COTTON SEEDS AND OTHER GRAIN

Application filed January 24, 1927. Serial No. 163,238.

This invention relates to new and useful improvement in a process and apparatus for treating cotton seed, oats, wheat, rice, barley and other soil products.

An important object of this invention resides in the treatment of soil products in order to provide voids therein and to fill these voids with a medium which will condition the product. More specifically the improved process consists of, first, removing the air contents of a soil product by vacuum, second, introducing moisture in the form of steam to fill the voids left by the removal of the air, and third, drying the treated product to remove any surplus moisture, in order to renew deficiencies of moisture.

Another object of the invention resides in the provision of an apparatus for carrying out the foregoing process and which is designed for efficiency and simplicity, and expedites the handling of the product to a very great degree.

Other objects and advantages of the invention will become apparent during the course of the following description.

The accompanying drawing forms a part of the description and represents a vertical section through the apparatus employed for carrying out the process.

As the process will be more thoroughly understood by reference to the apparatus, it will now be described in detail.

An air tight vacuum receptacle or chamber 1 in which the product is to be treated is preferably cylindrical and adapted to stand vertically. It is closed and sealed at its top with a head 2, and at its lower end with a head 3, both of which heads are connected to the body of the receptacle in a manner to exclude air from between the joints thereof. The head 2 is provided with an opening 4 covered by a suitable screen 5 and is connected by a conduit 6 having a valve 6a therein, to any suitable means for creating a vacuum within the chamber 1. This conduit 6 may be connected with the usual type of vacuum pump, not shown. The upper head 2 is also provided with an inlet opening 7 for the product to be admitted into the chamber 1, and is provided with a gate valve 8 which will exclude air from the chamber 1 when closed. This gate valve is provided in a conduit communicating with the opening 7 at one end and the conduit at its upper end communicates with a charging conveyor 9, which in the present instance, is in the form of a spiral screw conveyor.

The lower head 3 is equipped with an outlet opening 10 having a gate valve 11 similar to the valve 8, and likewise is positioned within a discharge conduit which communicates at its lower end with a discharge conveyor 12 similar to the conveyor 9. The product to be treated in admitted to the chamber 1 through the valve 8 and is discharged therefrom through the valve 11 and conveyor 12.

In order to supply moisture to the product within the chamber 1, a tubular shaft 13 is positioned axially of the chamber and has its upper end journalled in a bearing 14 in the upper head 2, while its lower end projects through the lower head 3 and packing gland 15 to depend a substantial distance below the chamber where it is equipped with a power instrumentality in the form of a pulley for imparting rotation thereto. The lower extremity of the tubular shaft 13 is equipped with a packing gland 17 through which projects a steam pipe 18 to enter the lower extremity of the tubular shaft to supply steam thereto. This steam line 18 is provided with a suitable valve 18a for controlling the passage of steam therethrough. A thrust collar 19 is secured to the shaft within the chamber 1 and the tubular shaft 13 within this chamber is provided at intervals throughout its length with orifices, as shown, in order that the steam will be sprayed out into the chamber 1. It will, of course, be understood that the bearing 14 is suitably packed to render the bearing air tight.

The vacuum chamber 1 is provided with a heating medium in the form of a helical steam coil 20 which is arranged closely to the interior surfaces of the walls of the chamber, as clearly shown. This coil has its upper outlet end projecting through the side of the chamber and equipped exteriorly thereof with a valve 21. Likewise, the inlet or lower end of the coil 20 projects through the side of the vacuum chamber and is also provided with a valve 22.

In order to permit the escape of excess steam from the chamber 1, a relief valve 23 is provided adjacent the top of the chamber.

A plurality of radiating blades 24 are secured in spiral relation to the tubular shaft 13 at spaced intervals throughout its length and these will assist in the discharge of the treated product when the shaft is rotated by the pulley 16, and may, if desired, be employed to agitate the mass within the chamber while it is undergoing the vacuum treatment which will now be described.

In carrying out the process, the discharge valve 11 is closed and the inlet valve 8 is opened to permit the product to be treated to enter and substantially fill the chamber 1. The inlet valve 8 is then closed, and the steam line valves 18a, 21 and 22 having been previously closed prior to the admission of the product into the chamber, the vacuum conduit valve 6a is opened and the vacuum pump started in order to exhaust air from to create a vacuum within the chamber 1. If desired the product can be softened prior to being subjected to the vacuum. It may be admitted to the chamber in such condition or it may be softened within the chamber prior to the withdrawal of the air from the chamber by subjecting the product either to steam from pipe 13, heat from coil 20, or both, depending upon the character or condition of the product to be treated.

The vacuum is maintained until the air within the chamber 1 and the greater part of air which is ordinarily trapped within the grain berries is practically removed to produce voids and carried off through the vacuum conduit 6. The vacuum valve 6a is then closed and the valve 18a is opened allowing live steam to enter the tubular shaft 13 and escape into the chamber 1 through the perforations in the shaft. This live steam percolates through the material being treated and fills the voids therein with moisture, any excess steam or presure being carried off through the relief valve 23. If desired, the vacuum valve 5a may be opened at intervals or left open continuously during the steaming and drying stages to exhaust air released in the chamber by the product or brought in with the steam during treatment of the product. After the steam has been allowed to saturate the material for a sufficient length of time and sufficient moisture has been imparted to the berries, the valve 18a is closed and if there is any surplus moisture in the material, this may be removed by opening the steam valves 21 and 22 and permitting steam to circulate through the steam coil 20 to dry off the surplus moisture. After the material has been supplied with the desired amount of moisture, the outlet valve 11 is opened and the shaft 13 rotated to cause the blades 24 to loosen the material and assist in feeding it out through the outlet opening 10 into the conveyor 12 which takes the material away from the chamber. Obviously, the shaft 13 may be rotated at any stage of the method and may be used to stir the products during treatment.

It is to be understood that various changes may be made in the method of carrying out the process or in the apparatus without departing from the scope of the appended claims.

What I claim is:—

1. The process of treating cotton seeds or grain consisting of first removing the air contents of the seeds by vacuum, second, introducing moisture in the form of steam into the voids, and then removing surplus moisture.

2. The process of treating cottonseeds or grain consisting of first removing the air contents of the seeds by vacuum, second, introducing moisture in the form of steam into the voids, and then drying to remove surplus moisture.

3. In a vacuum chamber, the combination of a valved feed inlet for admitting the product to be treated, a valved vacuum conduit communicating with said chamber, a vertical perforated rotary spray pipe in said chamber having agitating blades, and valve means controlling the flow through said pipe adapted to be closed with the valved feed inlet while said valved vacuum conduit is open to maintain a vacuum within said chamber.

4. In a vacuum chamber, the combination of means for admitting a product to be treated, means for establishing a vacuum within said chamber to remove air from said product, means for maintaining said vacuum, means for emitting moisture within said chamber, and heating means in said chamber.

5. In a vacuum chamber, the combination of means for admitting a product to be treated, means for establishing a vacuum within said chamber to remove air from said product, means for maintaining said vacuum, means within said chamber for supplying moisture to said product, and a heating coil disposed in said chamber.

6. In a treating chamber, a valved feed inlet for admitting a product to be treated, a valved vacuum conduit communicating with said chamber and adapted to extract air from the chamber and product, moisture spraying means within said chamber, and heating means within said chamber.

7. In a vacuum chamber, a valved feed inlet in the top thereof, a valved outlet in the bottom thereof, a valved vacuum conduit communicating with said chamber and adapted to remove air therefrom, a rotary spray pipe in said chamber provided with agitator blades, and a heating coil disposed in said chamber.

8. The process of treating soil products consisting of first softening the products, then removing the air content from said products by vacuum, then introducing a conditioning medium into the voids produced by the air removal, and then treating the products to cause them to retain a predetermined moisture content.

9. The process of treating soil products consisting of heating said products to soften the same, subjecting said products to a vacuum while they are in a softened condition, and then introducing a conditioning medium into said products.

10. The process of treating soil products consisting of treating said products to soften the same, subjecting said products to a vacuum while they are in a softened condition to create voids therein, and introducing a conditioning medium into said voids.

11. In a treating chamber, an inlet and outlet in the top and bottom thereof respectively, means for creating a vacuum in said chamber, heating means within said chamber, and a valved perforated liquid spray pipe extending axially through said chamber.

12. In a treating chamber, an inlet and outlet in the top and bottom thereof respectively, means for creating a vacuum in said chamber, heating means within said chamber, and an axially extended perforated spray pipe rotatably mounted axially in said chamber and having agitator blades extended therefrom.

13. In a treating chamber, an inlet and an outlet arranged in the top and bottom thereof respectively, means for creating a vacuum in said chamber, a heating coil arranged around the inner wall of said chamber, a rotary shaft extending axially through said chamber, and agitator blades on said shaft extending radially into close proximity to said heating coil.

14. In a treating chamber, an inlet and an outlet arranged in the top and bottom thereof respectively, means for creating a vacuum in said chamber, a heating coil arranged around the inner wall of said chamber, a rotary perforated pipe extending axially through said chamber, and agitator blades on said pipe extending radially into close proximity to said heating coil.

15. In a vacuum chamber, an inlet and an outlet arranged in the top and bottom thereof respectively, heating means within said chamber, means for admitting a conditioning medium in said chamber, and a vacuum bell at the top of said chamber, means for creating a vacuum in said bell and chamber, and a screen disposed between said bell and chamber.

JAMES R. RICHARDSON.